Sept. 27, 1966           G. BALCH           3,275,235
COMPARISON CALCULATOR
Filed Sept. 20, 1965           2 Sheets-Sheet 1
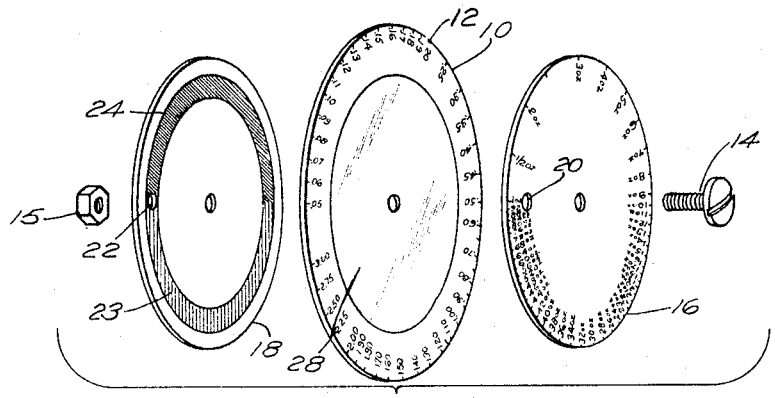
FIG. 1
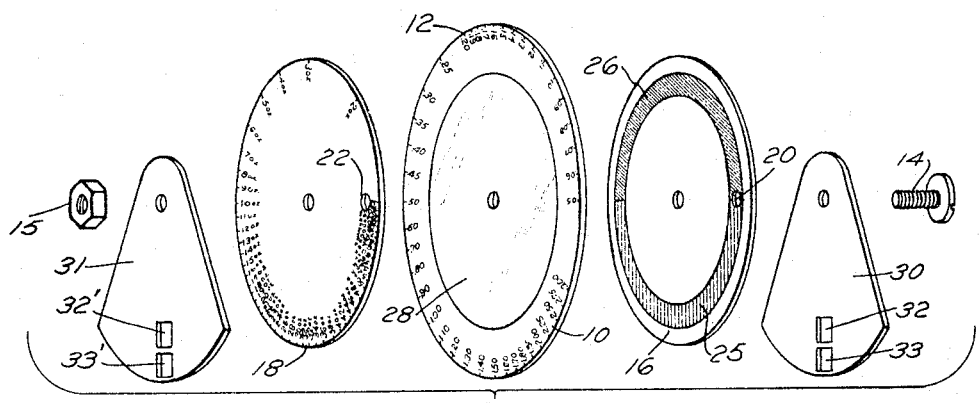
FIG. 2
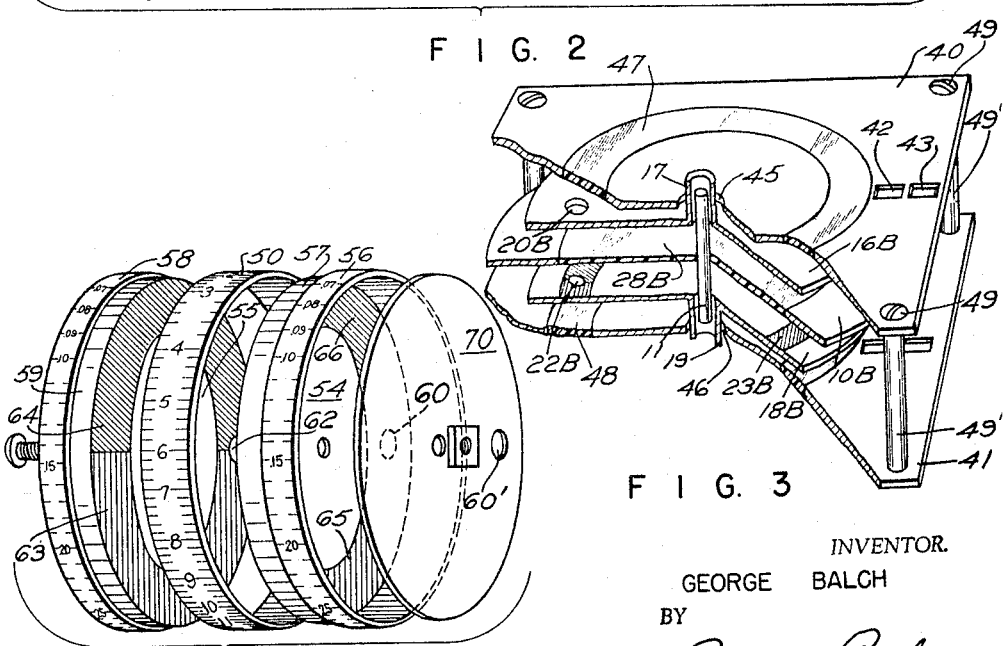
FIG. 3
FIG. 4
INVENTOR.
GEORGE BALCH
BY
Barlow + Barlow
ATTORNEYS Sept. 27, 1966  G. BALCH  3,275,235
COMPARISON CALCULATOR
Filed Sept. 20, 1965  2 Sheets-Sheet 2

INVENTOR.
GEORGE BALCH
BY
Barlow & Barlow
ATTORNEYS

United States Patent Office 3,275,235
Patented Sept. 27, 1966

3,275,235
COMPARISON CALCULATOR
George Balch 73 Taber Ave., Providence, R.I.
Filed Sept. 20, 1965, Ser. No. 488,525
7 Claims. (Cl. 235—84)

This invention relates to a computer of the hand-operated type and in general has for its principal object to provide a comparison between two products by a directness and simplicity which minimizes manipulatory skill and intellectual comprehension and is a continuation-in-part of my application, Serial No. 418,709, filed December 16, 1964, now abandoned.

Another object is the provision of the computer having at least two computing scales thereon which are arranged in such a fashion that the relative quotient or product of the two scales will be shown symbolically as an indicator type of information.

A computer of this nature, while it has a number of applications, has a primary application for one who desires to make a cost comparison between two items which are packed in different weights or quantities. For example, in a familiar grocery store a can of food may weight 7 ozs. and cost 38 cents while the same food packed by another packer is in a can weighing 8 ozs. and is priced at 45 cents. To find the cost per ounce of each packed can can be done either with a slide rule or by metal arithmetic, but at best this is laborious process and not everyone is skilled enough to make such mental calculations to determine in the given example that the 7-oz. can is the best buy.

Further, with prior methods of calculating, the answer that is given to the user is a numerical answer which requires the use of memory of the previous answer in order to obtain a comparison.

It is, therefore, one of the objects of this invention to provide a computing device which has as its input data the prices and weights of two products and makes it unnecessary to arrive at a numerical quotient but instead provides on a visible scale a graphic answer, which in the instant embodiment disclosed herein is in the form of two colors.

Simply stated, the object of the invention is to provide a hand-operated computer which will provide for each and either of two products an answer which does not have to be mentally compared as to numerical magnitude, but rather furnishes an immediate characterization of the answer in terms of the need, namely, buy (green) and don't buy (red).

With this and other objects in view, the invention consists in its many embodiments of certain novel features of construction as will be more fully described and particularly pointed out in the appended claims.

In the drawings:

FIG. 1 is a perspective exploded view of a first embodiment of the invention in which the computing system has been arranged on a plurality of disks.

FIG. 2 is a perspective exploded view of another form of the invention similar to that of FIG. 1 in which a rotatable selector window has been provided;

FIG. 3 is a perspective view of a still further form of the invention in which the disks of FIGS. 1 and 2 are now fully covered by a framing plate;

FIG. 4 is a perspective exploded view of another form of the invention;

Figure 5:
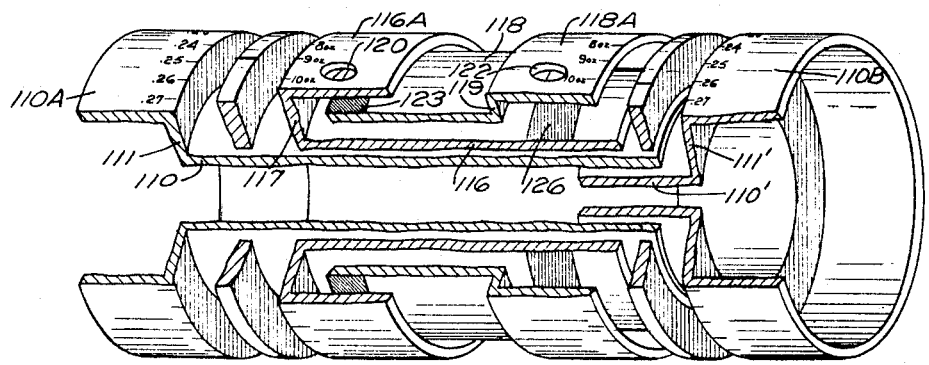
FIG. 5 is a perspective view of a still further form of the invention in which cylinders have been utilized.

The various embodiments of the invention each have a scale for each of the products to be compared carried by a member with the members for each product relatively movable along a predetermined path and with the scales progressing by the same units in the same direction relative to each other. Contrasting indicia such as colors red and green are carried by the members and correspondingly positioned with reference to apertures in the members at corresponding locations along the scales of the membes so that relative positions of the members may be viewed in terms of colors. Also some means to assist the positioning of the members with relation to input facts is also provided for the setting of the members with relation to each other.

For a clearer understanding of the invention, the various embodiments will be first described and then thereafter compared.

Referring now to the drawings, there is shown in FIG. 1 a central disk 10 which on the periphery thereof there is placed in suitable mathematical progression a scale of prices. This scale of prices is placed on both faces of the disk 10 in such a fashion that the scales are effectively mirror images of each other; that is, at the same point on the periphery of the disk 10, for example as at 12, the graduations on both sides of the disk 10 will be twenty cents. Viewed from one side, the scales on opposite sides progress in the same direction. The disk 10 is also provided with a central hole, and through this hole a pivot pin 14 is adapted to pass and hold in rotatable relationship with the main disk 10 disks 16 and 18. The periphery of each of the disks 16 and 18 is provided with graduations in suitable mathematical order such as illustrated in the drawing, and it will be noted that even with respect to the disks 16 and 18 that the direction of progression of the numbers in increasing fashion is effectively clockwise on the disk 16 and on its cooperating graduations on disk 10, while viewed from the face thereof the ascending progression of numbers on the disk 18 and its cooperating face of disk 10 (seen in FIG. 2) is in counterclockwise direction. In each of the disks 16 and 18 apertures are provided as indicated at 20 and 22, respectively. These apertures which serve as indicators may be at any point along the scale but must be at the same corresponding point on both scales. On the other side of the disks 16 and 18 from the surface on which the graduations appear are integral portions or indicia which are shown as colored strips. For disk 18 these strips are red over a semicircular section of the disk as at 23 starting at the aperture 22 and are green over the remaining semicircular portion as at 24 starting at the aperture 22. Similarly, on disk 16 on the reverse face starting from the aperture 20 a red semicircle is found as at 25 and a green semicircle as at 26 (FIG. 2). The disk 10 is transparent at the radius of the colored circles for a complete circle co-extensive with the strips of color providing a viewing window 28.

Assuming for the moment that the disks are in assembled relationship and further assuming that the apertures 20 and 22 are in alignment, this will mean that the green and red portions on the disks 16 and 18 are directly opposite each other. While the aperture in disk 16 must be the same radial distance as color strip on disk 18, and aperture in disk 18 the same radial distance as color strip in disk 16, the two apertures need not be the same radial distance as one another. In this case, when the two quotients are the same, there will be seen half-green and half-red through each aperture. When both apertures are made at the same radial distance, then equal quotients result in no color being seen thru either aperture. For certain mathematical reasons which need not be belabored here, the numerical progression on the various disks as indicated by the graduations are in logarithmic form for precisely the same reason that they are in logarithmic form on the usual slide rule. Other spacing of the scales may be used. The disks 10, 16 and 18 are fastened together by the fastening means 14 which has a cooperating nut 15 in a fashion such that the disk 10 is in the middle with the disks 16 and 18 on either side thereof facing outward. Since the aperture 20 is located the same radial distance outward on the disk 16 as the strips 23, 24, a similar condition being present with relation to aperture 22, there will be afforded a view at all times through the apertures 20 and 22 of a small portion of the colored strip on the other disk (except when the apertures register). When the disk 16 is rotated to correspond to its input data, the disk 18 is rotated to correspond to its input data. If the apertures 20 and 22 coincide and no color is seen through either hole, the products will be equal. When, however, the apertures do not coincide but differ, the color red will be seen from one side of the device, and the color green will be seen from the other side of the device. Of course, in the example chosen to operate the device, the user merely rotates the disks 16 and 18 relative to the disk 10 till the input numbers coincide with the input prices desired, and the side with the lowest quotient will immediately indicate through its proper aperture by showing the color green and the side of the largest quotient will appear through its proper aperture by showing the color red at the same time. This arrangement is, of course, particularly useful when the disks 16 and 18 display units of weight and the disk 10 displays units of value.

Referring now to FIG. 2 of the drawings, there is shown a modified form of a disk computer in which the like parts similar to those in FIG. 1 bear the same number. Further this particular view which is in exploded form is viewing the disks from the opposite side from that in FIG. 1, and in this fashion additional clarity is had of the manner in which the indica are placed upon the various disks, both figures to be used in conjunction with each other to amplify the disclosure. Here the three disks 10, 16 and 18 are pivoted together in identical fashion with a pivot member 14 but rotatable on the external portion of the disks 16 and 18 are slide members 30 and 31 which are provided with windows 32 and 33 and 32', 33', respectively, which windows overlie the scales on the three disks. For example, the windows 32, 32' overlie the scales on the disks 16 and 18, while the windows 33, 33' overlie the scales on the disk 10. By utilizing this particular form, the user is greatly facilitated in his calculations by being able to isolate the numbers being worked upon.

Referring now to FIG. 3 of the drawings, there is shown therein a further embodiment of the invention, there being a central disk 10B with a pivot pin 11 affixed thereto at the center thereof, the disk 10B carrying suitable peripheral graduations as the principal embodiment shown in FIG. 1. The disk 10B is also provided with a transparent portion 28B of circular extent about the center of the disk 10B. A second disk 16B is provided having graduations thereon in the same clockwise fashion as the previously described disk 16 and with the underside thereof provided with a colored band circularly placed about the center of the disk 16B the same distance radially outward as the transparent portion 28B of the disk 10B. Additionally, the disk 16B is provided with an aperture 20B and is pivoted about the post 11 in a suitable fashion, there being illustrated the use of a boss 17 which embraces the pivot post 11 for rotation relative thereto and is accessible for hand rotation. A disk 18B is also provided with similar graduations to the disk 18; that is, the graduations are arranged in a counterclockwise direction as viewed from the surface on which the graduations are placed. The disk 18B is also provided with a colored band 23B which is located radially outward from the center of the disk 18B the same distance as the transparent portion 28B. An aperture 22B is located within this colored band area, and as explained in the previous embodiment, the apertures 22B and 20B are located opposite identical graduations on the periphery of the disks 16B and 18B, respectively. The disk 18B is rotatably received around the center post 11 by providing a boss 19, and the entire assembly thus far described is received between two ends plates 40 and 41. The end plates 40 and 41 are shown of rectangular plan and are provided at two spaced locations radially outward from the center thereof with apertures 42, 43, respectively, which apertures are located to be in alignment with the indicia, respectively, on the disks 16B and 10B, or alternately with respect to the cover plate 41 to be in alignment with the indicia on disks 18B and 10B. A central hole as at 45 and 46 is provided on the end plates 40 and 41, respectively, and receive for hand rotation therein the bosses 17 and 19, respectively. In this fashion the disks 10B, 16B and 18B are held within a fixed position between the plates 40 and 41. Viewing of the readout obtained through the apertures 20B and 22B is had by providing a transparent section as at 47 in end plate 40 and 48 in end plate 41. These transparent sections are of circular extent spaced radially outward from the center apertures 45 and 46 of the end plates the same distance that the apertures 20B and 22B and the color bands such as 23B are spaced radially outward from the center. In this fashion viewing of the information seen through these apertures or indicators may be readily had from the exterior of the computer. The end plates are held together by fastening bolts such as 49 which are passed through spacer posts 49', and in this fashion the entire assembly of the material disks is had. The center disk 10B may be held by one hand, while the disks 16B and 18B are rotated by the tubular portions 17 and 19. The use of the device is identical to the use described in connection with the previous figures and need not be repeated here.

Referring now to FIG. 4 of the drawings, there is shown exploded view of a modified form of the invention where the scales have been placed into a cylindrical form, similar numerals being used as in FIGS. 1 and 2, only in the 50's series. In this embodiment there is a central cylinder designated 50 which corresponds to the central disk 10 and has suitable graduations marked thereon. Two additional cylindrical members 56 and 58 are provided to cooperate with a central cylindrical member 50. Each of these cylindrical members have graduations marked thereon in the same circular direction of ascendancy and are provided, respectively, with reduced or necked-down sections 57, 59, respectively, which allow these members 56 and 58 to nest within the cylindrical member 50. Walls 54 and 55 extend transversely of the members 56 and 58, respectively, and have central holes therein to receive a pivot pin which is adapted to hold members 50, 56 and 58 in rotatable relationship. On walls 54 and 55 colored bands are inscribed, and these colored bands or indicia are designated 63, 64, 65 and 66, bands 63 and 65 being red while bands 64 and 66 are green. As in the previous embodiment, these bands start at apertures 60 and 62. Assuming for the sake of illustration the walls such as 54 and 55 are translucent or transparent, a disk or other covering such as 70 must be provided with aligning apertures such as 60' to cover the walls 54 and 55 and permit viewing from that only through the apertures 60 and 62. The operation of this form is identical to the FIG. 1 embodiment.

Referring now to FIG. 5 of the drawings, there is shown in broken-away form the invention as it is embodied in another cylindrical form. So that equivalent parts may be readily identified, similar numerals are used as with the previous embodiments although here the numerals are in the 100's series. In this embodiment we have a pair of cylindrical parts which correspond to the central disk 10 and are embodied in a cylindrical member 110, 110' which are fixed together relative to each other so as to move as one unit and are merely provided in separable fashion so that the computer may be readily assembled. The cylindrical portions have rising radially outward therefrom web portions 111, 111' and terminating this web portion are cylindrical portions 110A, 110B which have graduations marked thereon, the graduations being marked in ascending order and in the same circular direction of ascendancy. Received about the cylinder 110 is a second cylinder 116 which carries a color band 126 and has a web 117 rising therefrom which terminates in a second cylindrical surface 116A upon which graduations are placed. Also through the second cylinder 116A an aperture 120 is provided. Surrounding the cylinder 116 is a third cylinder 118 which has a web portion rising therefrom to terminate in a cylindrical surface 118A upon which graduations are placed together with an aperture 122 above band 126. A colored band is located on the cylinder 118 as at 123 at a distance along the cylinder 118 so as to be viewable through the aperture 120 when the device is assembled. This particular embodiment works in identical fashion to the previously described embodiments, it being first noted that all of the graduations that have been marked on the cylinders 110A, 110B, 116A and 118A ascend circularly in the same direction. Basically, of course, only the cylinders 116 and 118 rotate, and easy manipulation of the device is had by rotating one cylinder 116A by the thumb of one hand and holding it in position while the cylinder 118A is rotated by the thumb of the other hand. The apertures 120 and 122 are, of course, located opposite identical numerical graduations on the scales present at 110A and 110B as was the case in the first described embodiment, the effect again being to obtain a visual readout of the lowest quotient or product as determined by the graduations on the computer.

Figure 6:
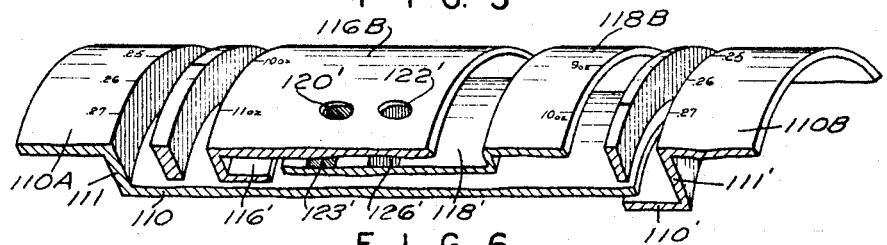
FIG. 6 is a fragmental perspective view of another form of a cylinder device in accordance with the invention.

Referring now to FIG. 6, a slight variation of the previous disclosed embodiment of FIG. 5 is shown herein, which variation is possible because of the cylindrical construction of the computer. As before, we have cylinders 110 and 100', but the cooperating cylinders 116' and 118' are slightly different. For example, the cylinder 116' is rotatable around the cylinder 110 as before but has an extended outer cylindrical portion 116B which is provided with a circularly ascending scale of weights and is also provided with two apertures 120' and 122'. Cylinder 118' also rotates around cylinder 110 and is here provided with a circularly ascending scale of weights and is also provided with two colored band areas, 123' and 125', which are viewable, respectively, through the apertures 120' and 122'. To provide the desired computed answer that we have been obtaining before with the previous embodiments, it is only necessary that the bands 123' and 126' be arranged 180° out of phase with each other; that is to say, on the identical sectors one band will be green while the other band is red and vice versa. The drawing illustrates this by being shaded for these two colors which are used merely in an exemplary fashion as indicia to explain the manner in which the device can operate.

Figure 7:
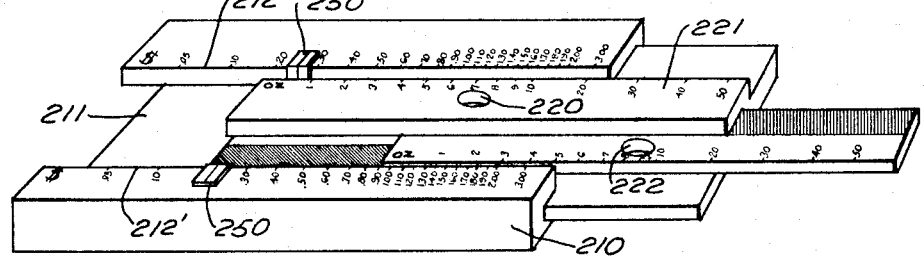
FIG. 7 is a perspective view of a device in accordance with the invention that has been made into a slide rule form.
Figure 8:
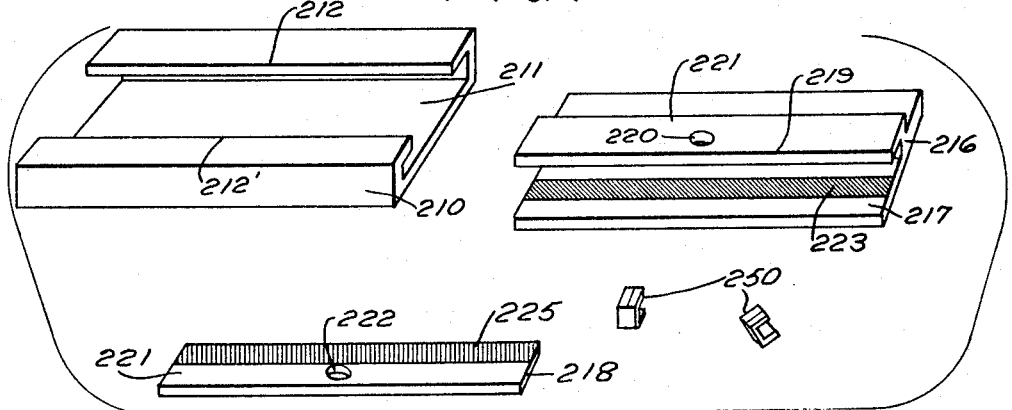
FIG. 8 is an exploded perspective view of the members of the device of FIG. 7.

Referring now to FIG. 7 of the drawings, I have shown a further embodiment in which the three computing elements have been arranged is slide rule fashion. Here we have a main casing member 210 which is of general U-shape cross section with inturned flanges carrying graduations thereon, the graduations being arranged in ascending numerical sequence from left to right as illustrated in the drawings. Received directly within the longitudinal recess 211 is a second member 216 formed by the cross sectional shape shown. The second member 216 which is slidably received in the recess 211 is formed with a ledge portion 217 which carries the color indicia band 223. Further an overhanging portion 219 lies over the ledge 217 and has an aperture 220 formed therethrough. Graduations are located along an edge of the ledge 219 as at 221 and cooperate with the graduations as at 212 on the main body member 210. Slidably received between the ledge 217 and the portion 219 is a bar 218 which carries colored indicia as at 225 and an aperture as at 222. With the second and third members 216 and 218 slidably received together, it will be apparent that the aperture 220 and 222 are in alignment with the color bands 225 and 223, respectively. Further it will be noted that the alignment of the third member 218 221 cooperate with the graduations on the edge of the first member 210 as at 212'. In operation the device is similar to the disk and cylindrical computers already described, the color portion as seen through the apertures 220 and 222 being indicative of the relative product or quotient that is determined by the scales which are in association with each other. Clips 250 may be used for sliding along edges 212, 212' for convenience in locating the markings used.

It will be apparent from the above that in each of the various forms of the invention there are two relatively movable members 16, 18; 16B, 18B; 56, 58, 116, 118; 216, 218 upon which scales of the same units progress in the same direction relative to the motion between the members and that there is provided some means for relatively setting these two movable members to bear a relation to each other which in the various forms is the opposite sides of disk 10, or 10B, cylinder 50, the duplicate scales 110A, 110B separated for adjacency to the scales on members 116A and 118A or 210 with the separated scales 212 and 212' for the same purpose. The apertures 20, 22; 20B, 22B; 60, 62, 120, 122; 220, 222 and the same circular color bands starting at the aperture location are placed at the same fixed points with relation to the scales in the corresponding member in which the apertures appear although a similar relation is provided to the same visual effect by the apertures 120', 122' in FIG. 6 in one member with a reversed relation of the color bands 123', 125' with respect to FIG. 5.

In each case the input data is set up by moving member 16 in accordance with its scale and moving member 18 in accordance with its scale and then reading the comparison in terms of distinguished marks or indicia such as colors red and green through two apertures to get two comparative indications in terms of a double answer that is both red and green.

I claim:

1. A comparison computer comprising a pair of adjacent relatively movable members, each member having thereon graduations in a predetermined progression in the same direction, a third member having graduations associated with the pair of members and with reference to which the pair of members may each move for adjusting their graduations which are in cooprative relationship with the graduations on the third member, means associated with said pair of members comprising indicia strips on one and indicators in the other in cooperative relationship with said strips, said means being so positioned with reference to said graduations on said pair of members as to visibly and concurrently indicate to the user the comparative results secured by the relative position of said members.

2. A comparison computer comprising a plurality of members, a first member having a plurality of numerical graduations in a predetermined mathematical progression thereon, a second member having a plurality of numerical graduations in a predetermined mathematical progression thereon in registration with graduations on said first member, a third member having a plurality of numerical graduations in the identical progression to those on the second member in registration with graduations on said first member, said second and third members including a pair of indicia and indicators, each indicia visibly and concurrently indicating to the user the comparison of results secured by the position of the second member relative to the first as against the third member relative to the first member.

3. A comparison computer comprising a plurality of members, a first member having numerical graduations in a predetermined mathematical progression thereon, a second member having numerical graduations in a predetermined mathematical progression thereon in registration with graduations on said first member, a third member having numerical graduations in the identical progression to those on the second member in registration with the graduations on said first member, said second and third members having indicia means thereon, and indicator means on said second and third members cooperating with the indicia means of the third and second members respectively to visibly indicate to the user the comparison of results secured by the position of the second member relative to the first as against the third member relative to the first member.

4. A comparison computer as in claim 3 wherein the second and third members contain a cylindrical surface upon which said graduations are located, each member having a wall extending transversely thereto, said indicia and indicators being located on said walls.

5. A comparison computer comprising a plurality of members, a first member having two sets of numerical graduations in a predetermined mathematical progression thereon, each set having a predetermined relation with reference to the other, a second member having a set of numerical graduations in a predetermined mathematical progression thereon in registration with one set of graduations on said first member, a third member having a set of numerical graduations in the identical progression to those on the second member in registration with the other set of graduations on said first member, a second member in registration with the other set of graduations on said first member, said second and third members having cooperating means comprising apertures and integral portions thereof that lie directly beneath the apertures of the other member, an indicia strip on each integral portion extending in a parallel manner to the graduations on the second and third members, and located so as to be visible through an aperture, said indicia strips having at least two distinct portions, whereby the relative value of the computed figures of the juxtaposed graduations may be readily obtained.

6. A comparison computer as in claim 5 wherein the predetermined relation of the graduations on the first members is that one set is a mirror image of the other.

7. A comparison computer as in claim 5 wherein the cooperating means comprises an aperture on the second and third member and the integral portion is on the third and second member, respectively.

No references cited.

RICHARD B. WILKINSON, *Primary Examiner.*